INVENTOR.
Hunter C. Goodrich
BY W. H. Sprague
ATTORNEY

INVENTOR.
Hunter C. Goodrich

BY [signature]
ATTORNEY

April 26, 1955 H. C. GOODRICH 2,707,248

ELECTROMAGNETIC BEAM-CONVERGENCE SYSTEMS FOR TRI-COLOR KINESCOPES

Filed Nov. 26, 1952 4 Sheets-Sheet 3

INVENTOR.
Hunter C. Goodrich

BY W. H. Sprague
ATTORNEY

INVENTOR.
Hunter C. Goodrich
BY W. A. Sprongle
ATTORNEY

1

2,707,248

ELECTROMAGNETIC BEAM-CONVERGENCE SYSTEMS FOR TRI-COLOR KINESCOPES

Hunter C. Goodrich, Collingswood, N. J., assignor to Radio Corporation of America, a corporation of Delaware Application November 26, 1952, Serial No. 322,653

35 Claims. (Cl. 315—13)

This invention relates to systems for controlling the electron beams of cathode ray tubes and particularly to systems in which a plurality of beams is deflected by a common deflection apparatus.

One type of cathode ray tube with which the present invention may be successfully employed is a color kinescope of the general type described in an article titled "A Three-Gun Shadow-Mask Color Kinescope," by H. B. Law published in the Proceedings of the I. R. E., vol 39, No. 10, October 1951, at page 1186. Such a tube forms the subject matter of Patent No. 2,595,548, issued May 6, 1952 to Alfred C. Schroeder, and titled "Picture Reproducing Apparatus." Such a tube has a luminescent screen as part of a target electrode in which different phosphor areas produce differently colored light when excited by electron beam components impinging upon it from different angles, the angle of impingement determining the particular color of the light produced by the phosphor areas. The invention also pertains to a kinescope of the type described in another article titled "A One-Gun Shadow-Mask Color Kinescope," by R. R. Law, published in the Proceedings of the I. R. E., vol. 39, No. 10, October 1951 at page 1194. Such a tube is the subject matter of a copending U. S. patent application of Russell R. Law, Serial No. 165,552, filed June 1, 1950, and titled "Color Television."

It is necessary to effect substantial convergence of the different electron beam components at all points of the raster scanned thereby at the target electrode. In general, this convergence may be effected by means of apparatus such as that disclosed in an article titled "Deflection and Convergence in Color Kinescopes" by A. W. Friend, published in the Proceedings of the I. R. E., vol. 39, No. 10, October 1951, at page 1249. One such system in accordance with the disclosure of this article forms the subject matter of a copending application of Albert W. Friend, Serial No. 164,444 filed May 26, 1950, and titled "Electron Beam Controlling System." Such beam convergence apparatus includes an electron-optical system by which to control the beam convergence angles. The electron-optical system is variably energized as a function of the radial angle of beam deflection.

The type of beam convergence apparatus shown in the Friend paper, to which reference has been made, has been found to operate satisfactorily. It does, however, require the use of relatively complicated apparatus which also requires for its energization either substantial amounts of power for an electromagnetic system or high voltages for an electrostatic system.

It, therefore, is an object of this invention to provide an improved electromagnetic beam convergence-controlling system for use with cathode ray tubes such as a tri-color kinescope.

Another object of the invention is to provide an improved electromagnetic beam convergence-controlling system which is simpler, more efficient and utilizes less complicated apparatus than heretofore employed.

A further object of the invention is to provide an improved electromagnetic beam convergence-controlling system in which a substantial decrease may be effected in the energizing power consumption therefor.

Still another object of the invention is to provide an improved electromagnetic beam convergence apparatus for effecting individual control of the plurality of beam components.

Another object of the invention is to provide improved circuit arrangements by which to produce directly from the beam deflection circuits energy by which to energize electromagnetic convergence apparatus.

2

In accordance with this invention, the apparatus which is provided for controlling the convergence of a plurality of electron beam components at a target electrode structure comprises, in general, a means for producing a plurality of electron beam components which traverse predeflection paths that are spaced respectively about the longitudinal axis of the tube, and individual electromagnetic means located respectively adjacent to the predeflection beam paths and of such character to be energizable, for example, directly from the beam deflection circuits, in a manner to effect the desired beam convergence. In this manner, the beam convergence angle may be varied in a manner suitable to maintain the desired beam convergence at all points in the raster scanned at the target electrode.

More particularly, it will be understood that the term "beam components" as used in this specification and in the appended claims denotes either a plurality of individual electron beams emanating, respectively, from a plurality of electron guns or from a single electron gun provided with suitable electron-optical, or other apparatus, for forming three individual beams and, in addition, those components of a single electron beam to which is imparted a spinning motion so as to trace a substantially conic locus at different positions thereof. Accordingly, the apparatus by which a plurality of such electron beam components is produced may include on the one hand, three electron guns or, on the other hand, a single electron gun, together with the auxiliary apparatus by which the spinning motion is imparted to the beam. Likewise, the electromagnetic apparatus by which the convergence of the beam components is effected may be dynamically, as well as statically, energized where it is employed in combination with a plurality of electron guns for producing three electron beams. On the other hand, where such apparatus is employed in conjunction with a single spinning beam type of apparatus, it may be energized only in a static manner so as to effect the desired convergence of the beam components. Additionally, the energizing means may be employed to control the operation of the beam component-producing apparatus, in the case of a single beam embodiment of the invention, whereas in the three beam apparatus it is employed to dynamically control the operation of the beam-converging apparatus so as to effect the desired variation in the beam convergence angle.

The novel features that are considered characteristic of this invention are set forth with particularity in the appended claims. The invention itself, however, both as to its organization and method of operation, as well as additional objects and advantages thereof, will best be understood from the following description when read in conjunction with the accompanying drawings.

Figure 1:
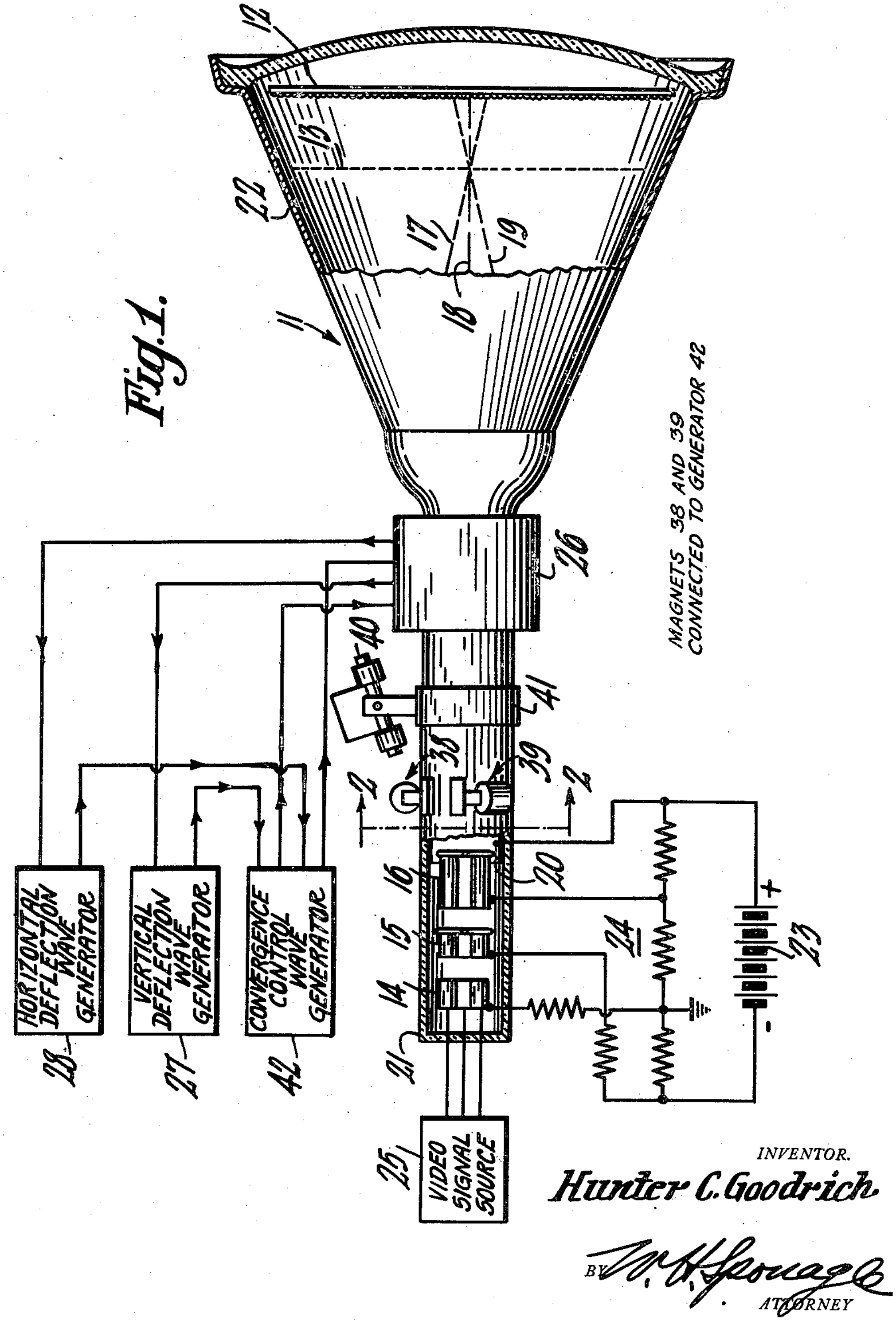
Figure 1 is a view showing the general arrangement of image-reproducing apparatus embodying one form of an electron beam convergence system in accordance with this invention.

Reference first will be made to Figure 1 for a general description of an illustrative embodiment of electron beam convergence system in accordance with the present invention. The system includes a tri-color kinescope 11 which may be of the same general type as that disclosed in the H. B. Law paper previously referred to. It will be understood, however, that the kinescope, alternatively, may be of other types such as that shown in the R. R. Law paper. In either case, however, the kinescope preferably has a luminescent screen 12 provided with a multiplicity of small phosphor areas arranged in groups and capable respectively of producing light of the different primary colors in which the image is to be reproduced when excited by an electron beam. In back of and spaced from the screen 12 there is an apertured masking electrode 13 having an aperture for and in alignment with each group of phosphor areas of the screen 12.

In the particular tube illustrated, the kinescope also has a plurality of electron guns, equal in number to the number of primary colors in which the image is to be reproduced. Each of these guns may be conventional, consisting of a cathode, a control grid and a focussing electrode. Since the three-guns are identical, the different parts thereof will be referred to collectively as the cathodes 14, the control grids 15, and the focussing electrodes 16. The three electron guns produce schematically represented beams 17, 18 and 19 by which to energize, respectively, the blue, red and green phosphor areas of the screen 12. When these electron beams are properly converged at the masking electrode 13 they pass through the apertures thereof from different directions and impinge upon different phosphor areas of the various groups so as to produce blue, red and green light. It is to be noted that the size of the phosphor areas, the angles between the beams and the spacing of the mask 13 from the screen 12 as compared with the length of the tube are exaggerated for better illustration of the operation of the kinescope.

The electron-optical apparatus of the kinescope 11 also includes a beam-accelerating electrode consisting, in the present instance, of a conductive wall coating 20 formed on the inner surface of the tubular glass neck 21 of the kinescope extending from the region adjacent to the outer end of the focussing electrodes 16 to the conical section 22 of the tube which in this case is metallic. Suitable electrical connection (not shown) is made at the junction of the wall coating with the metal cone 22. Preferably, the target electrode structure, including the masking electrode 13 and the luminescent screen 12 which for this purpose may be metallized, is electrically connected to the metal cone 22 by suitable means (not shown). Metallization of a luminescent screen of the character described may be effected in the manner disclosed in a paper by D. W. Epstein and L. Pensak titled "Improved Cathode Ray Tubes with Metal-Backed Luminescent Screens" published in the RCA Review, vol. VII, March 1946, at pages 5 to 10.

The described electrode structure of the kinescope may be energized in a conventional manner such as that illustrated. The source of energy is represented by a battery 23 across the terminals of which there is connected a voltage divider 24. The cathodes 14 are connected to the grounded point of the voltage divider and the control grids 15 are connected to a point which is somewhat negative relative to ground. Similarly, the focussing electrodes 16 are connected to a point on the voltage divider which may conventionally be at a potential of approximately 3000 volts positive relative to the grounded cathodes. Also the beam-accelerating anode, including the wall coating 20 and metal cone 22, is connected to the voltage divider 24 at a point which may conventionally be approximately 18,000 volts positive relative to the grounded cathodes.

The electron beams 17, 18, and 19 are modulated suitably in intensity under the control of color-representative video signals derived from a source 25. It will be understood that the video signal source is represented herein entirely diagrammatically since it does not form an essential part of the present invention. The signal source 25 usually will be part of a signal receiver and may be understood to include a signal detector, or equivalent device, together with one or more stages of video signal amplification. Alternatively, the video signal source may be a color television camera in the event that the kinescope 11 is employed as a monitor, for example. Also, it will be understood that the illustrated connection of the video signal source 25 to the electron guns of the kinescope 11 is merely diagrammatic and accordingly these connections may or may not be made directly to the cathodes 14. Instead, it will be understood, that they may be made to the grids 15 or, in accordance with some modes of operation of color image-reproducing apparatus, the video signal source may be connected both to the cathodes and to the control grids of the electron guns.

Also associated with the color kinescope 11 is a deflection yoke 26 which may be entirely conventional including two pairs of suitably placed coils electrically connected together in such a manner that, when properly energized, electromagnetic fields are produced, whereby to effect both horizontal and vertical angular deflections of the electron beams so as to scan the usual rectangular raster. Energization of the deflection coils comprising the yoke 26 may be effected by conventional vertical and horizontal deflection wave generators 27 and 28, respectively. Such apparatus will be understood to function suitably to produce substantially sawtooth energy at both horizontal and vertical deflection frequencies so that the fields produced by the yoke 26 are varied in a substantially sawtooth manner.

The beam convergence system, in accordance with the present invention, also includes a plurality of electromagnetic field producing elements such as the magnets 38 and 39 mounted around the neck 21 of the color kinescope adjacent to the pre-deflection paths of the electron beam components. It is to be understood that the precise location of these magnets is not necessarily indicated in this figure. Instead, as will appear in greater detail from a subsequent portion of the specification, it is to be understood that each of these magnets is located relative to one of the electron beam components so as to influence its associated beam component to the substantial exclusion of the others. Furthermore, it is to be understood that these magnets are of a character which, when suitably energized, produce respective fields which are transverse to the associated beam paths.

Each of these convergence electromagnets includes a pair of spaced pole pieces and at least one energizing winding. Preferably two windings are provided for each of the electromagnets for separate energization. These features will be described subsequently in greater detail.

The beam convergence apparatus in accordance with this invention also includes a beam-orienting electromagnet 40 which is mounted for pivotal movement upon a bracket 41 of a form suitable to be attached to the neck 21 of the color kinescope 11. The beam-orienting magnet, mounted so as to influence only one of the electron beam components, also is provided with a suitable winding structure which, when energized, produces a suitable field in the vicinity of the associated beam component by which to effect a beam movement that is substantially at right angles to the movement thereof produced by one of the convergence magnets such as 38 and 39. The effectiveness of the beam-orienting magnet 40 is made variable by the provision of the pivotal mounting therefor.

The beam convergence magnets such as 38 and 39 are energized in accordance with this invention under the control of a convergence control wave generator 42. This generator functions in a manner to be described to produce the desired control waves which may be made to vary as functions of the horizontal and vertical beam deflection. The energy for the control wave generator 42 is derived from the deflection circuits linking the deflection wave generators 27 and 28 to the deflection yoke 26. In general, the convergence control wave generator is effectively connected in series with both the horizontal and vertical coils of the deflection yoke 26. The beam-orienting magnet 40 is energized by direct current also in a manner to be described subsequently.

Before describing the details of the convergence system embodying the present invention, a brief description will be given of the general manner in which the apparatus functions to produce the desired results. The convergence magnets such as 38 and 39 are energized by substantially unidirectional energy so as to effect an initial convergence of the electron beam components substantially at a particular point of the apertured masking electrode 13. In order to do this, the unidirectional energization of these magnets is effected in such a way that the magnets may be individually energized in different magnitudes. Also, in effecting the initial beam convergence, the alignment magnet 40 is suitably energized and oriented relative to the beam component with which it is associated.

In effecting this initial beam convergence, it is to be understood that the beams may be in any desired one of their different deflected positions. For example, they may be initially converged at the center of the raster to be scanned. Alternatively, they may be initially converged at one corner of the raster.

The convergence magnets such as 38 and 39 also are dynamically energized by the control wave energy derived from the generator 42 so as to effect a variation in the magnitude of the transverse fields produced respectively thereby. These field strength variations are in accordance with a predetermined function of the beam deflection. Variations in the strength of the fields produced by the convergence magnets such as 38 and 39 effect corresponding variations in the paths of the electron beam components relative to the longitudinal axis of the tube. Hence, suitable variations are made in the convergence angles between the various beam components so as to produce the desired convergence of the beam components substantially at the masking electrode 13.

Figure 2:
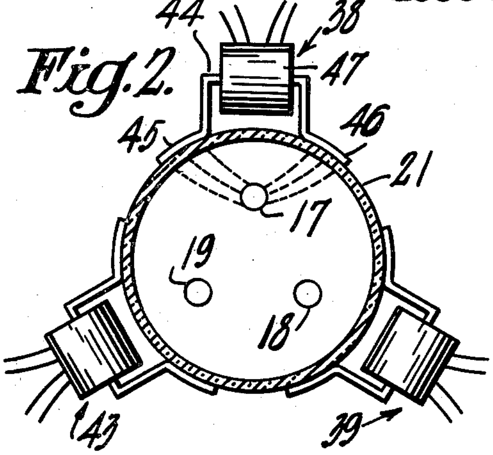
Figure 2 is a transverse cross-sectional view taken generally on the line 2—2 of Figure 1.

For a description of more of the details of the illustrative embodiments of the invention, reference now will be made to Figure 2 of the drawings. This figure shows more clearly the relative positions of the convergence magnets, such as 38 and 39 and, additionally, 43, relative to one another and to the electron beams with which they are respectively associated. Inasmuch as all of these magnets are substantially the same, only one of them will be described in detail. The convergence magnet 38, which is associated with the blue electron beam 17, is provided with a core having a body portion 44 and two pole pieces 45 and 46. These pole pieces are mounted so as to be in close association with the tube neck 21. Also, as more clearly shown in Figure 3, the pole pieces extend for some distance longitudinally of the tube substantially as indicated. The magnet also is provided with an energizing coil structure 47 mounted upon the body portion 44. The energizing coil 47 preferably is provided with two windings, one for static energization and the other for dynamic energization in a manner to be described subsequently. As indicated in Figure 2, the convergence magnet 38 produces a field which, in the vicinity of the electron beam 17, is substantially transverse to the axis of the kinescope. By means of such a field, the electron beam 17 may be moved toward or away from the longitudinal tube axis. The direction and magnitude of such a beam movement is controlled by the energization of the magnet by means including the coil 47.

Figure 3:
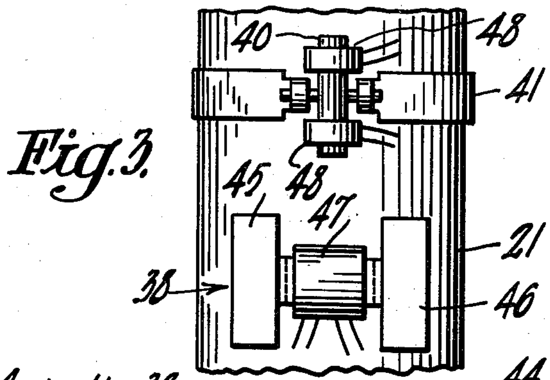
Figure 3 is a fragmentary plan view of that portion of the image-reproducing apparatus of Figure 1 embodying the beam convergence apparatus in accordance with the invention.

Figure 3 also indicates the manner in which the beam-orienting, or alignment, magnet 40 is located relative to the other apparatus embodying the invention. It is seen that its position is such as to influence the electron beam 17. For its energization, there is provided a pair of coils 48 which may be connected in a manner to be described subsequently. It is seen that the energization of the alignment magnet 40 also produces a field which is substantially transverse to the axis of the kinescope and in such position as to influence the beam 17. Also, it may be seen that the transverse field produced by the alignment magnet 41 is, in general, in a plane at right angles to that in which is located the field produced by the convergence magnet 38. Accordingly, the effect of the field produced by the alignment magnet is to move the beam 17 substantially horizontally to either the right or to the left, as viewed in Figure 2 of the drawings. The strength of the field produced by the alignment magnet 40 may be controlled by the energization of its coils 48. Also, the position of the field may be changed by pivoting the magnet in its supporting bracket 41, substantially as previously described.

Figure 4:
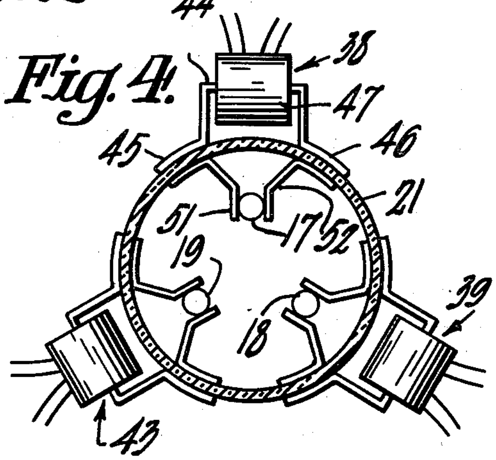
Figure 4 is another transverse cross-sectional view taken generally along the line 2—2 of Figure 1 showing another form of the invention.

In Figure 4, a modified form of the convergence magnet structure is illustrated. For each of the magnets there is provided on the inside of the tube neck 21 extended pole pieces so as to increase the effectiveness of these magnets. The magnet 38, for example, is provided with a pair of inwardly extending pole pieces 51 and 52, associated respectively with the external pole pieces 45 and 46. By such means, it is seen that the reluctance of the magnetic circuit is considerably decreased, and also the flux distribution of the field produced between the internal pole pieces 51 and 52 is considerably improved.

Figure 5:
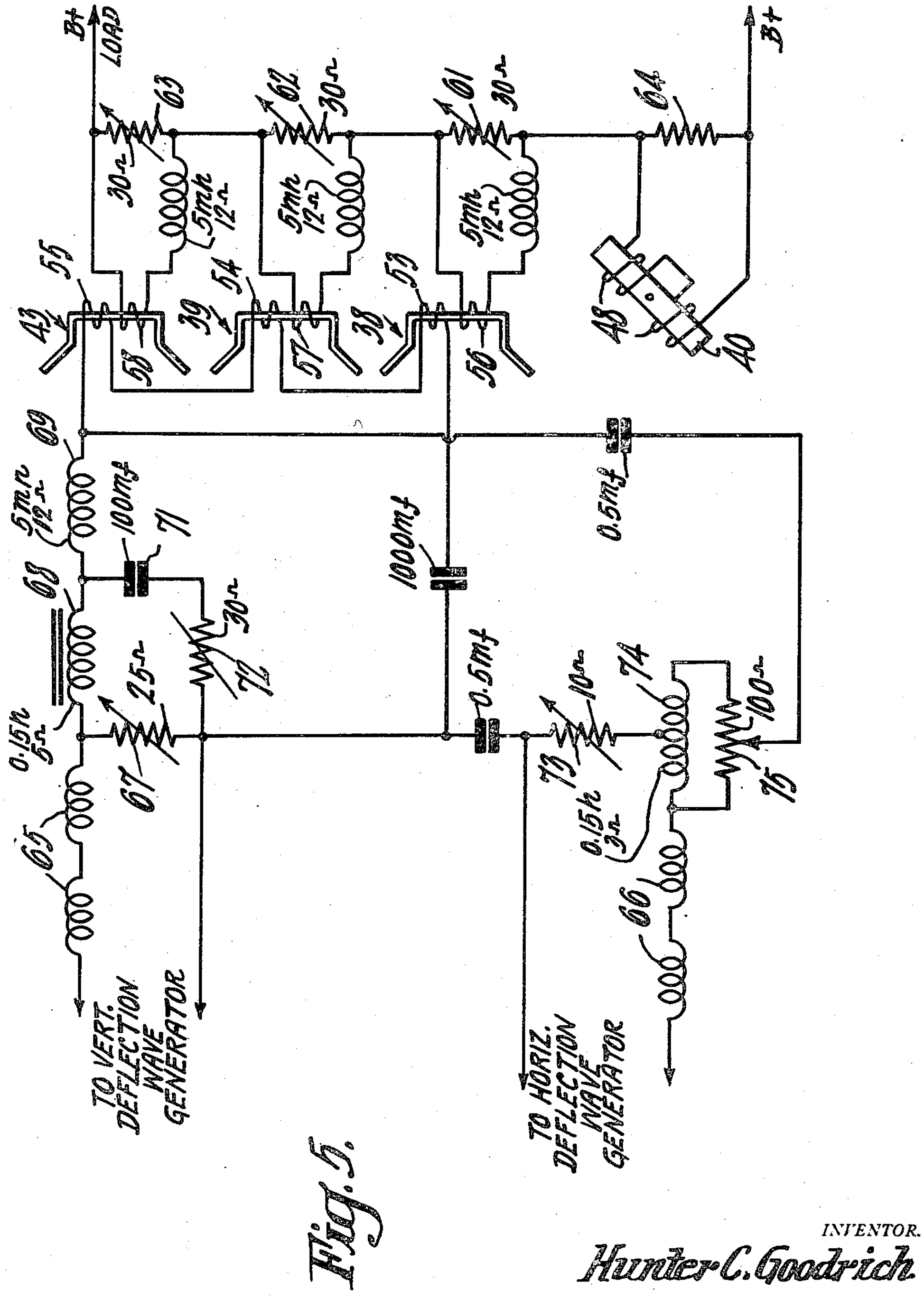
Figure 5 is a schematic circuit diagram of an arrangement in accordance with the invention for energizing the electromagnetic beam convergence apparatus.

Reference now will be made to Figure 5 of the drawings for a description of an illustrative circuit by means of which the magnetic beam convergence apparatus may be energized. The energizing coils of the convergence magnets 38, 39 and 43 include dynamic windings 53, 54 and 55, respectively. These convergence magnets also include static windings 56, 57 and 58, respectively. In one successfully operated form of the invention, each of the dynamic and static magnet windings consisted of 100 turns of No. 30 wire so that each winding has an inductance of approximately 0.8 millihenries and a resistance of approximately 2 ohms. The energizing circuit for the static convergence windings 56, 57 and 58, together with the energizing coils 48 of the beam alignment magnet 41, includes a series circuit of resistors 61, 62, 63 and 64 connected between the positive terminal of a power supply and its load. Preferably, the resistors 61, 62 and 63 are adjustable so as to individually control the energizing current for the associated static windings of the convergence magnets 38, 39 and 43, respectively. It will be appreciated that the effectiveness of the alignment magnet 40 also may be varied by making the resistor 64 adjustable. In such a case the magnet 40 may be mounted in a fixed position, if desired.

The dynamic windings 53, 54 and 55 of the convergence magnets 38, 39 and 43 respectively are connected in series with one another, and to the vertical and horizontal electron beam deflection circuits substantially as indicated. It is seen that the dynamic windings of the convergence magnets are coupled effectively in series with the vertical windings 65 of the deflection yoke 26, and also with the horizontal windings 66 of the deflection yoke. Thus, the convergence magnets may be energized dynamically as functions of both vertical and horizontal beam deflection angles.

In the operation of the convergence magnet energizing apparatus of Figure 5, the vertical deflection current traversing the vertical yoke winding 65 produces a sawtooth voltage across the resistor 67 which, as indicated, preferably is made variable so as to control the amplitude of the convergence control wave. Inductance means, such as an inductor 68 coupled to the resistor 67, has the property of performing a current integrating action whereby, a substantially parabolic current wave at vertical deflection frequency traverses the dynamic windings 53, 54 and 55 of the convergence magnets 38, 39 and 43 respectively.

The resistance components of the integrating inductor 68 and another inductor 69, or horizontal frequency choke coil, in series therewith, together with the resistive components of the dynamic convergence magnet windings 53, 54 and 55 produce a small sawtooth component in the substantially parabolic current wave traversing these circuit elements. As a result of this sawtooth component, the peaks of the parabolic wave are slightly advanced in phase or displaced slightly to the left on a time base running from left to right. The capacitor 71, connected effectively across the resistor 67 and the integrating inductor 68, has the effect of producing an opposite, or retarding, phase shift by which to move the peaks of the parabolic wave slightly to the right, relative to a time base. Accordingly, a variable resistor 72 in series with the capacitor 71, is provided so as to provide a symmetry control for the substantially parabolic wave at vertical deflection frequency in order that the convergence apparatus may be suitably operated to effect the desired result with different deflection yokes.

In a somewhat similar manner, a sawtooth voltage at horizontal deflection frequency is developed across a resistor 73, which preferably is made variable so as to provide an amplitude control for the horizontal convergence wave. This voltage also is impressed upon the dynamic windings 53, 54 and 55 respectively of the convergence magnets 38, 39 and 43 by means including a center-tapped inductor 74, at least a portion of which is connected in series with the horizontal yoke winding 66 and the resistor 73. Inductance means, which in this case comprises the dynamic windings 53, 54 and 55, functions to integrate the sawtooth voltage wave to produce a substantially parabolic current wave for energization of the dynamic convergence magnet windings.

The deflection current in the horizontal winding 66 of the yoke also produces a voltage pulse during flyback or retrace intervals. This voltage pulse is developed across the left hand portion of the inductor 74 as viewed in the drawing. This pulse also is impressed upon the dynamic windings of the convergence magnets by means including a potentiometer 75 connected across the inductor 74. The inductance of dynamic windings 53, 54 and 55 causes an integration of the voltage pulse to form a small sawtooth current component through these windings. The potentiometer 75 provides a facility for controlling the magnitude and polarity of the voltage pulses impressed upon the convergence magnet and thereby functions as a symmetry control for the substantially parabolic current wave at horizontal frequency by which the convergence magnets are excited.

In the construction of color kinescopes with which the present invention is designed to operate, the electron guns usually are arranged in such a manner as to produce the respective electron beams in a substantially triangular arrangement, a typical one of which is illustrated in Figures 2 and 4. It is to be understood, however, that other arrangements may be used without requiring any essential or fundamental change in the beam convergence controlling system according to the present invention. In practice with a beam arrangement such as that shown in Figure 2, it is seen that the red and green beams 18 and 19 are subjected to substantially the same portion of the deflecting field produced by means such as the yoke 26 of Figure 1 and, therefore, respond to such influence substantially in the same manner. However, the blue beam 17 is necessarily subjected to the influence of a different portion of the deflecting field and, accordingly, does not necessarily respond in the same manner as the red and green beams. It has been found that the active conductors in the horizontal coils of the yoke 26 can be so distributed that the red and green rasters produced at the target electrode coincide substantially throughout and particularly including the corners thereof. However, such a distribution of the yoke conductors may produce a misregistration of the blue raster, particularly at the corners. Accordingly, it is the purpose of another feature of the present invention to eliminate or at least to minimize to an unobjectionable extent this misregistration of the blue raster with the red and green rasters.

This feature is illustrated in a representative embodiment of the invention shown in Figure 6, to which reference now will be made. The components, which are the substantial equivalents and which perform the same functions as those described with reference to Figure 5, are given the same reference characters in Figure 6. In this connection, it is to be noted that the arrangement of these components is somewhat different in the two circuits. It is to be expressly understood, however, that the function of these components is substantially the same in the two circuits. In the case of the apparatus of Figure 6, the dynamic winding **53*a* of the blue convergence magnet 38 is provided with a greater number of turns than the corresponding dynamic windings 54 and 55 of the red and green magnets 39 and 43, respectively. More specifically, in accordance with the embodiment of the invention shown in Figure 6, the red and green dynamic windings 54 and 55 may consist of 65 turns of No. 28 wire and the blue dynamic winding 53*a* may comprise 140 turns of No. 28 wire which, it may be seen, is approximately twice the number of turns as in the red and green dynamic windings. Also, in this form of the invention, the static windings 56, 57 and 58 of the respective magnets 38, 39 and 43** may comprise 100 turns of No. 30 wire as in the form of the invention shown in Figure 5.

It is seen that, by this means, the dynamic flux produced by the blue magnet 38 is approximately double of that produced by the other two magnets 39 and 43. However, in order to provide a facility for producing exactly the correct amount of flux by the blue magnet 38, the dynamic winding **53*a* is shunted by an inductor 76 and a resistor 77. The inductor 76 is provided with an adjustable core 78 which may be moved in the usual manner to vary the effective inductance of the inductor 76**.

Since in the present case it is only desired to increase the dynamic flux at horizontal or line deflection frequency, it is necessary to provide a facility for preventing the concomitant increase of the dynamic flux at vertical or field deflection frequency. Accordingly, the D.-C. resistance of the inductor 76 is made relatively low so that it, together with the resistor 77 which also has a relatively low resistance, provides a shunt path around the winding **53*a* for a part of the vertical frequency dynamic current. The exact proportion of the vertical current which is shunted is determined by the resistance of the resistor 77 which, accordingly, preferably is made adjustable as indicated. The resistor 77 has a negligible effect upon the dynamic current at horizontal deflection frequency because of the fact that the resistance thereof is small compared with the reactance of the inductor 76** at this frequency.

In order to provide a further control for the symmetry of the dynamic current at horizontal deflection frequency which is effective in the blue magnet 38, the inductor 79, which is connected in series with the static winding 56 of this magnet, is provided with a variable resistor 81 which, as indicated, is connected in parallel therewith.

Figure 6:
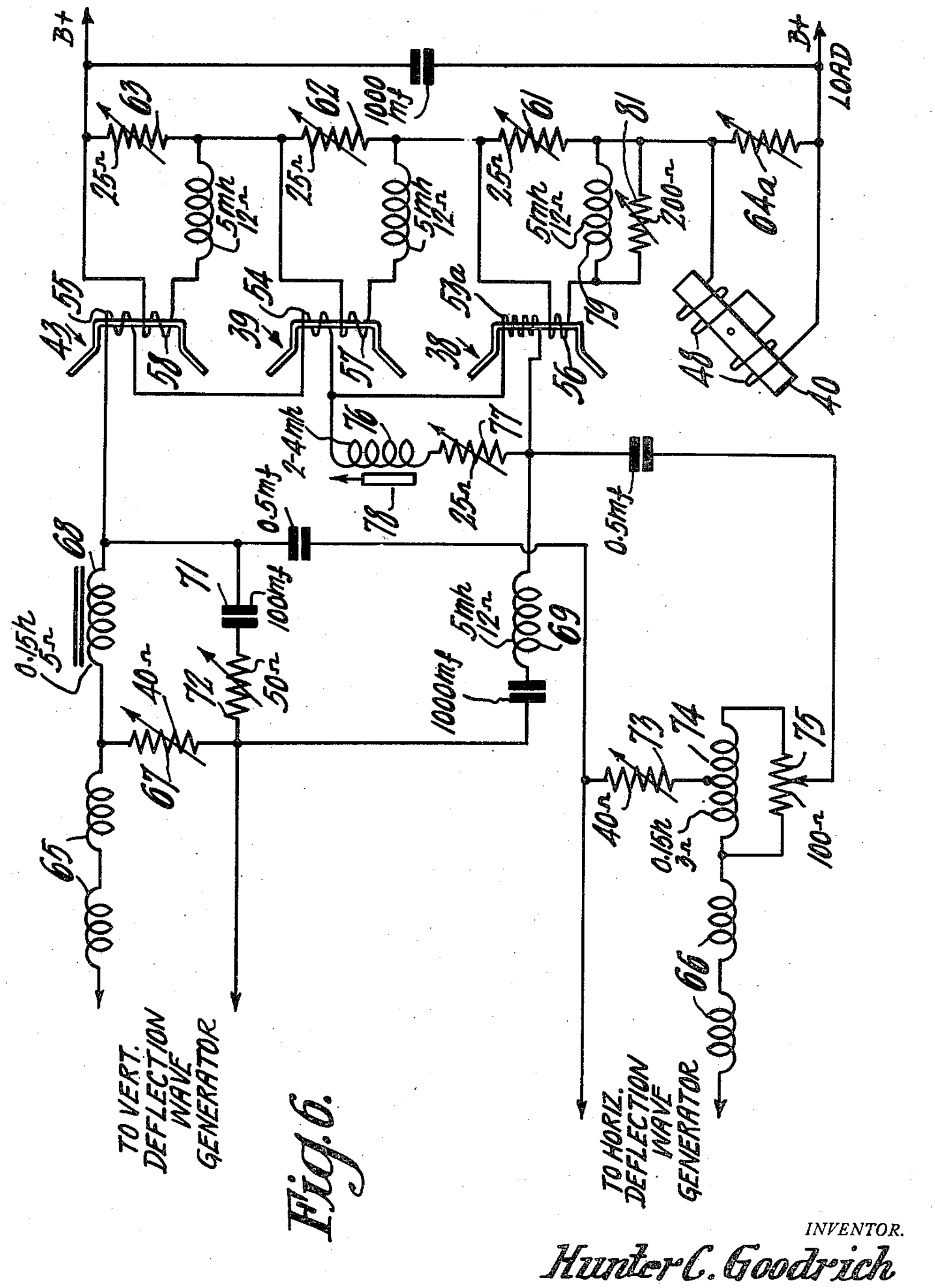
Figure 6 is a schematic circuit diagram of another arrangement in accordance with the invention for energizing the electromagnetic beam convergence apparatus so as to provide an additional convergence control.

It also will be noted from the circuit of Figure 6, that the beam orientating magnet 40 is provided with an adjustable resistor **64*a* connected in parallel with the energizing winding 48. The purpose of making this resistor adjustable is, as indicated previously in the description of the circuit shown in Figure 5, to provide a facility for varying the effectiveness of the magnet 40** instead of, or in conjunction with, the facility by which the positioning of this magnet may be changed for a substantially similar purpose.

It has been found that, in many cases, the energization of the beam convergence apparatus need not always be effected by means of a wave having a substantially parabolic shape. In such cases, a sinusoidal wave is an acceptable approximation of the more ideal parabolic wave. A beam convergence system operating by the employment of a substantially sinusoidal wave at line scanning frequency forms the subject matter of a copending U. S. Patent application of G. E. Kelly and R. D. Flood, Serial No. 198,314, filed November 30, 1950, and titled "Electron Beam Convergence Systems." Accordingly, another feature of the present invention is apparatus for deriving such a sinusoidal beam convergence control wave at line scanning frequency directly from the electron beam deflection apparatus.

Figures 7, 8:
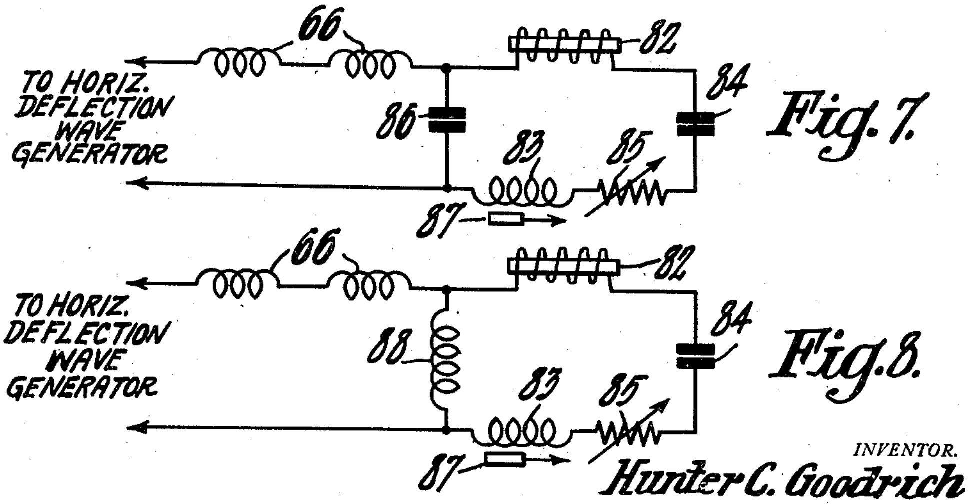
Figure 7 is a fragmentary circuit diagram embodying another feature of the present invention for energizing electromagnetic beam convergence apparatus; and, Figure 8 is a circuit diagram of a modified form of the energizing apparatus shown in Figure 7.

One form of such a feature of this invention is shown in Figure 7 to which reference now will be made. The electromagnetic beam convergence apparatus 82 is intended to represent apparatus such as that shown in Figures 1, 2, 3 and 4, or it may be a single electron lens. A substantially sawtooth current wave derived from the horizontal deflection yoke coil 66 is caused to traverse a circuit including the convergence apparatus 82, a variable inductor 83, a resonating capacitor 84 and an amplitude-controlling variable resistor 85. A capacitor 86, connected in shunt with the described circuit, produces a substantially 90° phase shift of the current wave flowing in the described circuit with respect to the fundamental component of the sawtooth current wave flowing in the deflection coil 66. The circuit including the convergence apparatus 82, the variable inductor 83 and the resonating capacitor 84 is tuned to the horizontal or line deflection frequency. This circuit thus is traversed by a substantially sinusoidal current wave at the line deflection frequency in the proper phase so as to effect the desired energization of the electromagnetic convergence apparatus 82 for achieving convergence of the electron beams substantially at the target electrode at all points of the scanned raster. An adjustment of the core 87 with which the inductor 83 is provided may be made to produce slight phase adjustments which may be needed for the control of the symmetry of the convergence wave. In such a circuit, the magnitude of the current flowing through the convergence apparatus 82 is approximately proportional to the "Q" of the resonant circuit. Accordingly, the variable resistor 85 functions as an amplitude control of the convergence wave by effecting a variation of the "Q" of this circuit.

A somewhat similar circuit for energizing the beam convergence apparatus by a sinusoidal current wave is shown in Figure 8 to which reference now will be made. This circuit is basically the same as that of Figure 7 with the exception that the desired 90° phase shift between the deflection and convergence current waves is produced by an inductor 88 connected across the convergence control circuit substantially as shown.

The circuits of Figures 7 and 8 are particularly useful for deriving a convergence control current wave directly from the deflection apparatus at line scanning frequency when the inductance of the magnetic convergence apparatus is appreciable, such as in the case where a single electromagnetic electron optical device is employed. In such a case, it is not feasible to produce a substantially parabolic current wave such as in the apparatus of Figures 5 or 6 by integration of the horizontal deflection current. The reason for this is that the product of the inductance of the convergence apparatus and the dynamic current required is too great. Hence, it is more economical to produce the energizing current wave by resonating the winding of the convergence apparatus at the line scanning frequency so as to produce the substantially equivalent sinusoidal current wave for the control of beam convergence.

It, therefore, may be seen from the foregoing description of the illustrative embodiments of the invention and different features thereof that there is provided an improved electromagnetic beam convergence-controlling system for use with multiple beam cathode ray apparatus, such as tri-color kinescopes of the kind described. Such a system is somewhat simpler and more efficient in its operation than systems heretofore employed. As a result, a substantial saving may be effected in the required energizing power for such a system. One of the features of the present invention is the provision of electromagnetic apparatus by which individual control of a plurality of beam components may be effected so as to produce the desired convergence of the beam convergence. Inasmuch as less energizing power is required for apparatus embodying this invention, another feature is in the improved circuit arrangements by which the energizing wave forms may be derived directly from the beam deflection apparatus.

The nature of the invention may be ascertained from the foregoing description of the illustrative embodiment thereof. Its scope may be determined by reference to the appended claims.

What is claimed is:

1. In a cathode ray tube image-reproducing system wherein a plurality of electron beam components, which traverse pre-deflection paths that are spaced respectively about the longitudinal axis of the tube, are angularly deflected both horizontally and vertically by beam deflection apparatus to scan a raster at a target electrode structure, an electron beam convergence system comprising, electromagnetic apparatus mounted adjacent to said pre-deflection beam paths and energizable to produce respective fields transverse to said beam paths, and means directly coupled to and deriving energy from said raster-scanning beam deflection apparatus and also coupled to and energizing said electromagnetic apparatus in a manner to direct said beam components relative to one another and to said longitudinal tube axis so as to effect substantial convergence of said beam components at all points of said scanned raster.

2. An electron beam convergence system as defined in claim 1 wherein, said electromagnetic apparatus includes respective magnets for said beam components capable when energized of moving said beam components radially relative to said longitudinal tube axis, and another magnet for one of said beam components capable when energized of moving said one beam component laterally relative to said longitudinal tube axis.

3. An electron beam convergence system as defined in claim 2 wherein, said energizing means is of a character to effect dynamic energization of said radially beam-moving magnets at said raster-scanning beam deflection frequencies.

4. An electron beam convergence system as defined in claim 3 wherein, said energizing means is of a character to effect static energization of said radially beam-moving magnets and of said laterally beam-moving magnet.

5. An electron beam convergence system as defined in claim 4 wherein, said energizing means includes facities for individually varying said static energization of predetermined ones of said beam-moving magnets.

6. An electron beam convergence system as defined in claim 5 wherein, said energization-varying facilities comprise variable resistors coupled to said radially beam-moving magnets, and said laterally beam-moving magnet is provided with a mounting of a character to enable reorientation of said laterally beam-moving magnet relative to said associated beam path.

7. An electron beam convergence system as defined in claim 1 wherein, said electromagnetic apparatus includes respective substantially identical magnets for said beam components capable when energized of moving said beam components radially relative to said longitudinal tube axis.

8. An electron beam convergence system as defined in claim 1 wherein, said electromagnetic apparatus includes respective substantially identical magnets for all but one of said beam components and a substantially different magnet for said one beam component, all of said magnets being capable when energized of moving said beam components radially relative to said longitudinal tube axis.

9. An electron beam convergence system as defined in claim 8 wherein, said substantially identical magnets have respective windings of a predetermined number of turns, and said substantially different magnet has a winding of more than said predetermined number of turns.

10. In a cathode ray tube image-reproducing system wherein a plurality of electron beam components, which traverse pre-deflection paths that are spaced respectively about the longitudinal axis of the tube, are angularly deflected both horizontally and vertically to scan a raster at a target electrode structure, electron beam convergence apparatus comprising, a plurality of electromagnets respectively mounted adjacent to said pre-deflection beam paths and energizable to produce respective fields transverse to said beam paths, each of said electromagnets having a core including a body portion located externally of said tube and extending transversely of said associated beam path, a pair of pole pieces respectively extending outwardly from opposite ends of said body portion, and an energizing coil mounted so as to encircle said core body portion.

11. Electron beam convergence apparatus as defined in claim 10 wherein, said core body portion is centered substantially in alignment with the path of said associated electron beam component and said longitudinal tube axis, and said pole pieces extend longitudinally of said beam path in both directions from said body portion.

12. Electron beam convergence apparatus as defined in claim 11 wherein, said energizing coil includes a dynamically energizable winding and a statically energizable winding.

13. In a cathode ray tube image-reproducing system wherein a plurality of electron beam components, which traverse pre-deflection paths that are spaced respectively about the longitudinal axis of the tube, are angularly deflected both horizontally and vertically by electromagnetic beam deflection apparatus to scan a raster at a target electrode structure, and wherein said beam components are substantially converged at all points of said scanned raster by dynamically energizable electromagnetic apparatus, an energizing system for said convergence apparatus comprising, means effectively connected in series with said raster-scanning beam deflection apparatus to produce a reshaped wave from the substantially sawtooth current wave derived from said beam deflection apparatus, and means impressing said reshaped wave upon and energizing said beam convergence apparatus.

14. In a cathode ray tube image-reproducing system wherein a plurality of electron beam components, which traverse pre-deflection paths that are spaced respectively about the longitudinal axis of the tube, are angularly deflected both horizontally and vertically by electromagnetic beam deflection apparatus to scan a raster at a target electrode structure, and wherein said beam components are substantially converged at all points of said scanned raster by dynamically energizable electromagnetic apparatus, an energizing system for said convergence apparatus comprising, means including a resistor connected in series with said raster-scanning beam deflection apparatus to produce a substantially sawtooth voltage wave, and inductance means coupled to said resistor to effect a current integration of said sawtooth wave thereby producing a substantially parabolic current wave, said parabolic wave functioning to energize said beam convergence apparatus.

15. An energizing system for electron beam convergence apparatus as defined in claim 14 wherein, said resistor is variable so as to effect an amplitude control of said parabolic wave.

16. In a cathode ray tube image-reproducing system wherein, a plurality of electron beam components, which traverse pre-deflection paths that are spaced respectively about the longitudinal axis of the tube, are angularly deflected both horizonally and vertically by electromagnetic beam deflection apparatus to scan a raster at a target electrode structure, and wherein said beam components are substantially converged at all points of said scanned raster by dynamically energizable electromagnetic apparatus, an energizing system for said convergence apparatus comprising, means including a resistor connected in series with said raster-scanning deflection apparatus to produce a substantially sawtooth voltage wave, a first inductor coupled to said resistor in a manner to effect a current integration of said sawtooth wave thereby producing a substantially parabolic current wave, and means including a second inductor coupling said first inductor to said beam convergence apparatus, the combined resistance of said inductors and said convergence apparatus functioning to develop a small sawtooth wave component which, in combination with said parabolic wave, effects a phase advancement of the peaks of said parabolic wave.

17. In a cathode ray tube image-reproducing system wherein, a plurality of electron beam components, which traverse pre-deflection paths that are spaced respectively about the longitudinal axis of the tube, are angularly deflected both horizontally and vertically by electromagnetic beam deflection apparatus to scan a raster at a target electrode structure, and wherein said beam components are substantially converged at all points of said scanned raster by dynamically energizable electromagnetic apparatus, an energizing system for said convergence apparatus comprising, means including a resistor connected in series with said raster-scanning deflection apparatus to produce a substantially sawtooth voltage wave, a first inductor coupled to said resistor in a manner to effect a current integration of said sawtooth wave thereby producing a substantially parabolic current wave, means including a second inductor coupling said first inductor to said beam convergence apparatus, the combined resistance of said inductors and said convergence apparatus functioning to develop a small sawtooth wave component which, in combination with said parabolic wave, effects a phase advancement of the peaks of said parabolic wave, and a capacitor connected effectively across said resistor and said first inductor to effect a phase retardation of the peaks of said parabolic wave.

18. In a cathode ray tube image-reproducing system wherein, a plurality of electron beam components, which traverse pre-deflection paths that are spaced respectively about the longitudinal axis of the tube, are angularly deflected both horizontally and vertically by electromagnetic beam deflection apparatus to scan a raster at a target electrode structure, and wherein said beam components are substantially converged at all points of said scanned raster by dynamically energizable electromagnetic apparatus, an energizing system for said convergence apparatus comprising, means including a resistor connected in series with said raster-scanning deflection apparatus to produce a substantially sawtooth voltage wave, a first inductor coupled to said resistor in a manner to effect a current integration of said sawtooth wave thereby producing a substantially parabolic current wave, means including a second inductor coupling said first inductor to said beam convergence apparatus, the combined resistance of said inductors and said convergence apparatus functioning to develop a small sawtooth wave component which, in combination with said parabolic wave, effects a phase advancement of the peaks of said parabolic wave, a capacitor connected effectively across said resistor and said first inductor to effect a phase retardation of the peaks of said parabolic wave, and a variable resistor connected in series with said capacitor and providing an adjustment for varying the phasing of said parabolic wave peaks for a symmetry control of said parabolic wave.

19. In a cathode ray tube image-reproducing system wherein a plurality of electron beam components, which traverse pre-deflection paths that are spaced respectively about the longitudinal axis of the tube, are angularly deflected both horizontally and vertically by electromagnetic beam deflection apparatus to scan a raster at a target electrode structure, and wherein said beam components are substantially converged at all points of said scanned raster by dynamically energizable electromagnetic apparatus, an energizing system for said convergence apparatus comprising, means including a series connection of said raster-scanning beam deflection apparatus and a resistor in which to produce a substantially sawtooth voltage wave, means coupling said resistor to said convergence apparatus, and means including the inductance of said convergence apparatus to effect a current integration of said sawtooth wave thereby producing a substantially parabolic current wave for energization of said convergence apparatus.

20. An energizing system for electron beam convergence apparatus as defined in claim 19 wherein, said series connection also includes an inductor in which a pulse is produced during the retrace interval in said deflection apparatus, said inductor functioning to integrate said pulse, whereby to develop a small sawtooth wave component for combination with said parabolic wave.

21. An energizing system for electron beam convergence apparatus as defined in claim 20 wherein, said coupling means includes a potentiometer connected across said inductor, the setting of which varies the amplitude and polarity of said sawtooth wave component to effect a symmetry control of said parabolic wave.

22. In a cathode ray tube image-reproducing system wherein a plurality of electron beam components, which traverse pre-deflection paths that are spaced respectively about the longitudinal axis of the tube, are angularly deflected both horizontally and vertically by electromagnetic beam deflection apparatus to scan a raster at a target electrode structure, and wherein said beam components are substantially converged at all points of said scanned raster by a plurality of dynamically energizable individual electromagnets for respective ones of said beam components, an energizing system for said electromagnets comprising, means effectively connected in series with said horizontal beam deflection apparatus to produce a reshaped wave at horizontal deflection frequency from the substantially sawtooth current wave derived from said deflection apparatus, means effectively connected in series with said vertical beam deflection apparatus to produce a reshaped wave at vertical deflection frequency from the substantially sawtooth current wave derived from said deflection apparatus, and means impressing said horizontal and vertical frequency reshaped waves upon and energizing said electromagnets.

23. In a cathode ray tube image-reproducing system wherein a plurality of electron beam components, which traverse pre-deflection paths that are spaced respectively about the longitudinal axis of the tube, are angularly deflected both horizontally and vertically by electromagnetic beam deflection apparatus to scan a raster at a target electrode structure, and wherein said beam components are substantially converged at all points of said scanned raster by a plurality of dynamically energizable individual electromagnets for respective ones of said beam components, one of said electromagnets being provided with a dynamic winding having a greater number of turns than others of said electromagnets, an energizing system for said electromagnets comprising, means effectively connected in series with said horizontal beam deflection apparatus to produce a reshaped wave at horizontal deflection frequency from the substantially sawtooth current wave derived from said deflection apparatus, means effectively connected in series with said vertical beam deflection apparatus to produce a reshaped wave at vertical deflection frequency from the substantially sawtooth current wave derived from said deflection apparatus, means impressing said horizontal and vertical frequency reshaped waves upon and energizing said electromagnets, and modifying means coupled to said one electromagnet to decrease the effectiveness of said vertical frequency reshaped wave in energizing said one electromagnet without appreciably decreasing the effectiveness of said horizontal frequency reshaped wave in energizing said one electromagnet.

24. An energizing system for electron beam convergence apparatus as defined in claim 23 wherein, said modifying means comprises an adjustable shunt effective at said vertical deflection frequency and connected across said one electromagnet.

25. An energizing system for electron beam convergence apparatus as defined in claim 24 wherein, said adjustable shunt includes an inductor having a sufficiently low resistance to divert a substantial portion of said vertical frequency reshaped wave from said one electromagnet, said inductor being adjustable so as to vary the effectiveness of said horizontal frequency reshaped wave in energizing said one electromagnet.

26. An energizing system for electron beam convergence apparatus as defined in claim 25 wherein, said adjustable shunt also includes an adjustable resistor to vary the diverted portion of said vertical frequency reshaped wave.

27. An energizing system for electron beam convergence apparatus as defined in claim 23 wherein, said electromagnets are additionally provided with respective static windings, means including respective series inductors coupled to and statically energizing said static windings, and an adjustable resistor connected in shunt with the one of said series inductors coupled to said one electromagnet to vary the symmetry of said horizontal frequency reshaped wave dynamically energizing said one electromagnet.

28. In a cathode ray tube image-reproducing system wherein a plurality of electron beam components which traverse pre-deflection paths that are spaced respectively about the longitudinal axis of the tube, are angularly deflected both horizontally and vertically by electromagnetic beam deflection apparatus to scan a raster at a target electrode structure, and wherein said beam components are substantially converged at all points of said scanned raster by dynamically energizable electromagnetic apparatus, an energizing system for said convergence apparatus comprising, reactive phase-shifting means connected in series with said raster-scanning beam deflection apparatus to produce a fundamental component of a voltage wave substantially 90° out of phase with the fundamental component of said deflection current wave derived from said beam deflection apparatus, and means including an inductor and a capacitor connected in series with said beam convergence apparatus across said phase-shifting means and producing a reshaped current wave from said voltage wave and impressing said reshaped wave upon said convergence apparatus, said inductor, said capacitor and said convergence apparatus forming a resonant circuit tuned to the operating frequency of said deflection, whereby said reshaped wave has a sinusoidal form.

29. An energizing system for electron beam convergence apparatus as defined in claim 28 wherein, said inductor is variable to effect phase adjustments of said sinusoidal current wave for symmetry control.

30. An energizing system for electron beam convergence apparatus as defined in claim 28 wherein, said wave-reshaping means additionally includes a series connected variable resistor to control the amplitude of said sinusoidal current wave.

31. An energizing system for electron beam convergence apparatus as defined in claim 28 wherein, said phase-shifting means includes a capacitor.

32. An energizing system for electron beam convergence apparatus as defined in claim 28 wherein, said phase-shifting means includes an inductor.

33. In a cathode ray tube image-reproducing system wherein a plurality of electron beam components, which traverse pre-deflection paths that are spaced respectively about the longitudinal axis of the tube, are angularly deflected both horizontally and vertically to scan a raster at a target electrode structure, an electron beam convergence system comprising, electromagnetic apparatus mounted adjacent to said predeflection beam paths and energizable to produce respective fields transverse to said beam paths, and means for energizing said electromagnetic apparatus as a function of said angular beam deflection to vary said respective transverse fields in a manner to direct said beam components relative to one another and to said longitudinal tube axis so as to effect substantial convergence of said beam components at all points of said scanned raster.

34. In a cathode ray tube image-reproducing system wherein a plurality of electron beam components, which traverse pre-deflection paths that are spaced respectively about the longitudinal axis of the tube, are angularly deflected both horizontally and vertically by beam deflection apparatus to scan a raster at a target electrode structure, an electron beam convergence system comprising, electromagnetic apparatus including respective magnets mounted adjacent to the pre-deflection paths of said beam components and energizable to produce respective fields transverse to said beam paths for moving said beam components radially relative to said longitudinal tube axis, and means deriving energy from said raster-scanning beam deflection apparatus for energizing said magnets in a manner to direct said beam components relative to one another and to said longitudinal tube axis so as to effect substantial convergence of said beam components at all points of said scanned raster.

35. In a cathode ray tube image-reproducing system wherein a plurality of electron beam components, which traverse pre-deflection paths that are spaced respectively about the longitudinal axis of the tube, are angularly deflected both horizontally and vertically to scan a raster at a target electrode structure, the combination comprising, a magnet for moving one of said beam components laterally relative to said longitudinal tube axis, electromagnetic apparatus mounted adjacent to said predeflection beam paths and energizable to produce respective fields transverse to said beam paths, and means for energizing said electromagnetic apparatus as a function of said angular beam deflection to vary said respective transverse fields in a manner to move said beam components radially relative to said longitudinal tube axis so as to effect substantial convergence of said beam components at all points of said scanned raster.

References Cited in the file of this patent

UNITED STATES PATENTS

| | | |
|---|---|---|
| 2,185,138 | Wolff | Dec. 26, 1939 |
| 2,289,319 | Strobel | July 7, 1942 |
| 2,348,133 | Iams | May 2, 1944 |
| 2,454,378 | Forgue | Nov. 23, 1948 |
| 2,541,446 | Trott | Feb. 13, 1951 |

FOREIGN PATENTS

| | | |
|---|---|---|
| 866,065 | France | Mar. 31, 1941 |